July 31, 1923.
J. E. BUTLER
1,463,667
METALLIC PISTON AND PISTON PACKING RING
Original Filed June 6, 1921
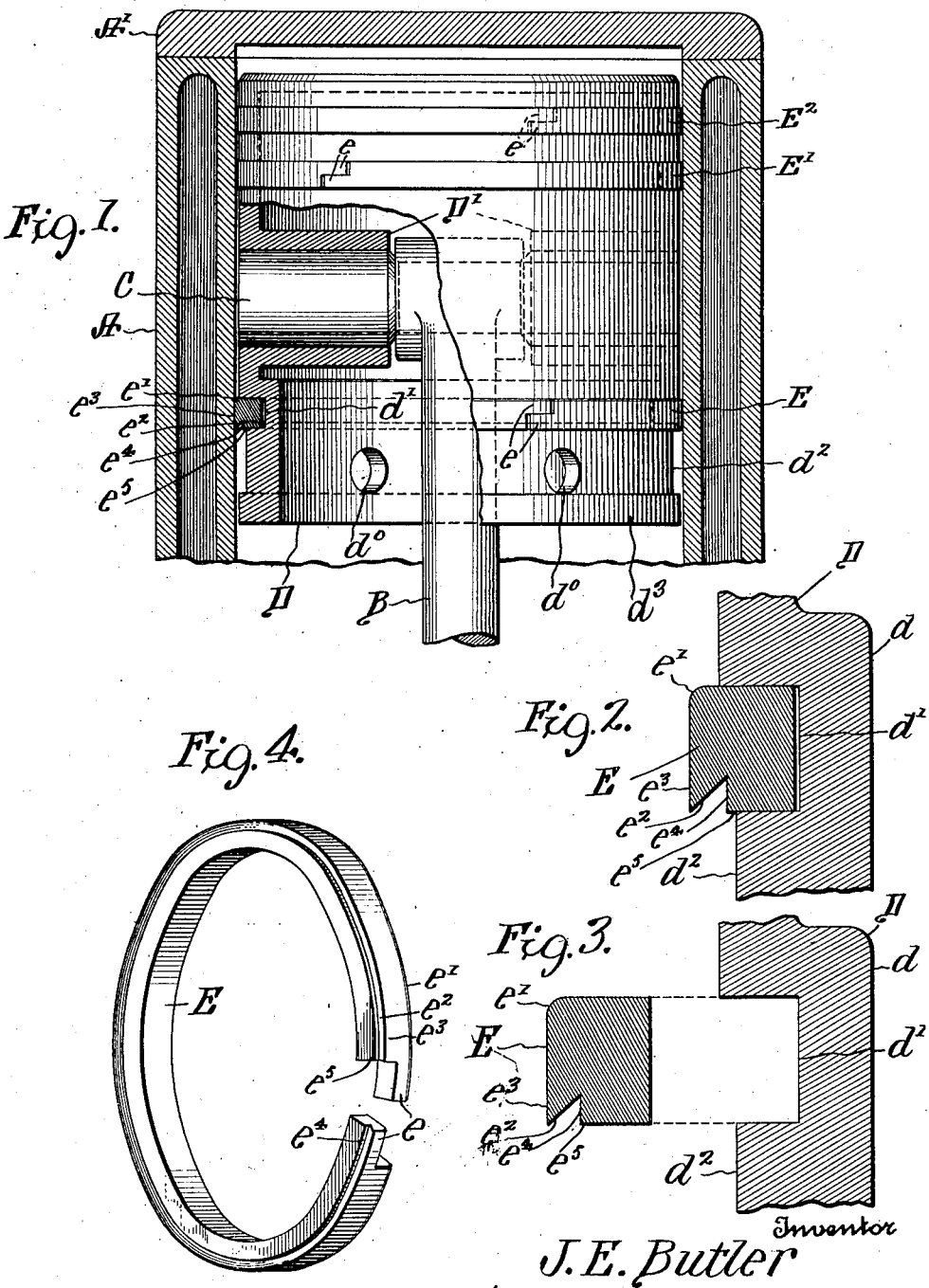

Patented July 31, 1923.

1,463,667

UNITED STATES PATENT OFFICE.

JAY EDGAR BUTLER, OF BALTIMORE, MARYLAND, ASSIGNOR TO VICTOR PISTON RING CO., OF BALTIMORE, MARYLAND, A CORPORATION OF MARYLAND.

METALLIC PISTON AND PISTON-PACKING RING.

Application filed June 6, 1921, Serial No. 475,415. Renewed July 31, 1922. Serial No. 578,847.

*To all whom it may concern:*

Be it known that I, JAY EDGAR BUTLER, a citizen of the United States, residing at Baltimore, State of Maryland, have invented certain new and useful Improvements in Metallic Pistons and Piston-Packing Rings; and I do hereby declare the following to be a full, clear, and exact description of the invention, such as will enable others skilled in the art to which it appertains to make and use the same.

My present invention relates to improvements in metallic pistons and the packing rings therefor, and it is intended to provide a more effective packing for the reciprocating pistons of engines, and more especially of internal combustion engines in which the cylinder is open at one end and closed at the other, and in which there is a tendency of the lubricating oil used in the cylinder to be sucked past the piston into the closed end of the cylinder during a portion of the cycle of operations of the engine.

According to my invention I provide an arrangement by means of which not only is a substantially tight joint secured but also there is a tendency always to direct the movement of the oil which accumulates on the inner surface of the cylinder from the closed towards the open end thereof, as will be hereinafter more fully described.

My invention will be more fully understood after reference to the accompanying drawings, in which like parts are indicated by similar reference symbols throughout the several views, and in which:—

Figure 1 shows a central axial section through a cylinder of any usual type, with the piston and packing rings shown therein partly in elevation and partly in section.

Figure 2 shows a section on a larger scale of a portion of the piston and one of the packing rings, the two being in the assembled position.

Figure 3 is a similar view to Figure 2, but shows the packing ring removed; and

Figure 4 is a perspective view of one of the packing rings as detached from the piston.

A represents a cylinder which may be of any usual or preferred type, closed at one end by the cylinder head A', and open at the other to permit the free motion therein of the connecting rod B which is connected to the wrist pin C, which is mounted in the usual way in the sleeves D' of the hollow piston D. This hollow piston is of the usual bell-shaped construction, that is closed at the front end and open at the rear, and is provided with inwardly projecting ribs $d$ provided with external grooves $d'$ to receive the packing rings.

We have shown three packing rings E, E' and $E^2$ which are of generally similar construction as shown in detail in Figures 2 to 4. The rear portion of the piston $d^2$ is provided with an annular oil groove in front of the rib $d^3$, which rib is preferably of the same diameter as the main body of the piston, and serves as a guide rib to prevent any wobbling or slapping of the piston as it vibrates in the cylinder. The oil groove $d^2$ is connected with the interior of the cylinder by one or more ports $d^0$. I have shown two of such ports in Figure 1, but the number may be increased if desired.

The packing rings are preferably of the form shown in Figures 2 to 4, being substantially rectangular in cross section, and the break in the ring being rectangular or L-shaped as shown at $e$, see Fig. 4. The front and outer edge of the ring is rounded, as shown at $e'$, and the rear edge of the ring is cut away at an angle, as at $e^2$, to form an annular cutting or scraping edge $e^3$. The inner edge of the annular cut in the rear wall of the ring is substantially cylindrical, as at $e^4$, see Figs. 2 and 3.

It will be noted that there is an annular shoulder $e^5$, see Fig. 2, between the inner wall $e^4$ of the cut in the ring, and the adjacent cylindrical surface $d^4$ of the piston D.

In assembling the parts, the rings are preferably mounted singly in their respective grooves, as shown, and may be removed separately when desired.

In operation, as the piston moves towards the closed end of the cylinder the rounded edge $e'$ of each packing ring will tend to slide over any liquid or solid matter that may have accumulated in the cylinder, and when the cylinder moves in the opposite direction, as after the charge of fuel has been ignited, the scraping edge $e^3$ will serve as an annular plane to scrape off any oil or other foreign matter that may have accumulated on the inside of the cylinder, tending to deliver same out through the open end of the cylinder.

It will be obvious that the packing ring E will scrape off most of the oil or other objectionable matter adhering to the inner walls of the cylinder. As this matter will accumulate on the downward stroke of the piston we provide the oil groove $d^2$ and also the ports $d^0$ for conveying the oil from said groove to the interior of the piston.

Thus it will be seen that with the herein described construction of packing ring the interior of the cylinder will be kept clean and the lubricating oil will be scraped off and directed towards the open end of the cylinder, and at the same time a highly efficient packing will be secured.

By having the scraping edge $e^3$ wedge-shaped as shown, this edge not only tends to scrape off any matter adhering to the interior wall of the cylinder, but also the usual wear on the exterior of the ring will tend to keep this scraping edge sharp, thus avoiding the dulling of this edge incident to long continued use.

By having the annular shoulder $e^5$ of the ring E project beyond the cylindrical face at the bottom of the oil groove $d^2$ of the piston D, any oil scraped from the inner wall of the cylinder, incident to the down stroke of the piston, is diverted from entering the clearance space between the ring and the piston, and is prevented from working around the sides and bottom of the ring to the opposite side of the ring from the scraping edge $e^2$.

It will be evident that various modifications might be made in the herein described apparatus, and in the construction, combination and arrangement of parts which could be used without departing from the spirit of my invention; and I do not mean to limit the invention to such details except as particularly pointed out in the claims.

Having thus described my invention what I claim and desire to secure by Letters Patent of the United States is:—

1. The combination with a cylinder, of a piston adapted to reciprocate therein, said piston being provided with an annular groove on the exterior therof, rectangular in cross section, and a packing ring substantially rectangular in cross section mounted in said groove, said ring being provided with an annular cut in its rear face to form an annular scraping edge on its rear outer face, said cut having its outer wall in the form of a hollow truncated cone, and its inner wall cylindrical, the said inner wall being located radially exterior to the circumference of the piston immediately in rear thereof, whereby an outwardly projecting annular shoulder is provided, substantially as and for the purpose described.

2. The combination with a cylinder, of a hollow piston adapted to reciprocate therein, said piston being provided with an annular rib near the base thereof and with an oil groove in front of said rib, with ports connecting said oil groove with the interior of the piston, and said piston being also provided with an annular groove on the exterior thereof, rectangular in cross section, and a packing ring substantially rectangular in cross section mounted in said groove, said ring being provided with an annular cut in its rear face to form an annular scraping edge on its rear outer face, said cut having its outer wall in the form of a hollow truncated cone, and its inner wall cylindrical, the said inner wall being located radially exterior to the bottom of the oil groove immediately in rear thereof, whereby an outwardly projecting annular shoulder is provided, substantially as and for the purpose described.

JAY EDGAR BUTLER.